US012020612B2

(12) United States Patent
Kim

(10) Patent No.: US 12,020,612 B2
(45) Date of Patent: Jun. 25, 2024

(54) DISPLAY DEVICE AND METHOD OF DRIVING THE SAME

(71) Applicant: Samsung Display Co., LTD., Yongin-si (KR)

(72) Inventor: Hyun Gue Kim, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/132,376

(22) Filed: Apr. 8, 2023

(65) Prior Publication Data

US 2023/0351933 A1 Nov. 2, 2023

(30) Foreign Application Priority Data

Apr. 29, 2022 (KR) ........................ 10-2022-0053476

(51) Int. Cl.
*G09G 3/00* (2006.01)
*G09G 3/20* (2006.01)
*G09G 3/3233* (2016.01)

(52) U.S. Cl.
CPC ........... *G09G 3/035* (2020.08); *G09G 3/2007* (2013.01); *G09G 3/2096* (2013.01); *G09G 3/3233* (2013.01); *G09G 2300/0842* (2013.01); *G09G 2320/045* (2013.01); *G09G 2320/0626* (2013.01); *G09G 2330/021* (2013.01); *G09G 2360/144* (2013.01)

(58) Field of Classification Search
CPC ............. G09G 2360/144; G09G 3/035; G09G 3/2007; G09G 3/2096; G09G 3/3233; G09G 2300/0842; G09G 2320/045; G09G 2320/0626; G09G 2330/021
See application file for complete search history.

(56) References Cited

U.S. PATENT DOCUMENTS

| | | | | |
|---|---|---|---|---|
| 2012/0268436 A1* | 10/2012 | Chang | G09G 3/3611 345/207 |
| 2014/0204037 A1* | 7/2014 | Kim | G06F 3/03 345/173 |
| 2018/0088699 A1* | 3/2018 | Dao | G09G 3/3225 |
| 2020/0265779 A1* | 8/2020 | In | G09G 3/3225 |
| 2021/0264863 A1* | 8/2021 | Wang | G09G 3/3266 |

FOREIGN PATENT DOCUMENTS

| | | |
|---|---|---|
| KR | 102252322 B1 | 5/2021 |
| KR | 102289274 B1 | 8/2021 |

* cited by examiner

*Primary Examiner* — Md Saiful A Siddiqui
(74) *Attorney, Agent, or Firm* — CANTOR COLBURN LLP

(57) ABSTRACT

A display device includes a housing, a display panel inserted into or withdrawn from the housing. The display panel includes a first display area and a second display area adjacent to the first display area with a boundary line therebetween, a battery which provides a power to the display panel, and a processor which drives the first display area in a display mode, in which the display panel displays an image in a state in which the first display area is withdrawn from the housing and the second display area is inserted into the housing. The processor drives the second display area in a charging mode, in which the battery is charged, in a way such that an average of degradation degrees of second pixels included in the second display area is equal to an average of degradation degrees of first pixels included in the first display area.

20 Claims, 9 Drawing Sheets

DISPLAY DEVICE AND METHOD OF DRIVING THE SAME

This application claims priority to Korean Patent Application No. 10-2022-0053476, filed on Apr. 29, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a rollable display device, and a method of driving the rollable display device.

2. Description of the Related Art

As technology for display devices develop, display devices having various forms are developed. For example, flexible display devices such as a foldable display device, a rollable display device, or the like are developed. The rollable display device has desired characteristics such as easy storage and use, since a display panel is inserted into a housing to be stored and the display panel is withdrawn from the housing to display an image.

The rollable display device may display an image in a state in which an entirety of a display area is withdrawn from the housing or in a state in which a first portion of the display area (a first display area) is withdrawn from the housing and a second portion of the display area (a second display area) is inserted into the housing.

SUMMARY

In a rollable display device, when the entirety of the display area displays an image in the state in which the first display area is withdrawn from the housing and the second display area is inserted into the housing, power consumption of the display device may increase since the second display area inserted into the housing displays an image. Further, when only the first display area displays an image in the state in which the first display area is withdrawn from the housing and the second display area is inserted into the housing, a difference in degradation degree between the first display area and the second display area may occur.

Embodiments provide a display device in which power consumption is reduced and a difference in degradation degree between a first display area and a second display area decreases.

A display device according to embodiments includes a housing, a display panel inserted into or withdrawn from the housing. In such embodiments, the display panel includes a first display area and a second display area adjacent to the first display area with a boundary line in between, a battery which provides a power to the display panel, and a processor which drives the first display area in a display mode, in which the display panel displays an image in a state in which the first display area is withdrawn from the housing and the second display area is inserted into the housing. In such embodiments, the processor drives the second display area in a charging mode, in which the battery is charged, in a way such that an average of degradation degrees of second pixels included in the second display area is equal to an average of degradation degrees of first pixels included in the first display area.

In an embodiment, when the first display area is driven in the display mode, a data signal corresponding to a minimum grayscale may be provided to each of the second.

In an embodiment, when the first display area is driven in the display mode, the processor may not drive the second display area in the display mode.

In an embodiment, the display device may further include an illuminance sensor which senses an illuminance of an ambient light. In such an embodiment, when the second display area is driven in the charging mode and the illuminance is greater than a reference illuminance, a data signal corresponding to a high grayscale may be provided to each of the second pixels.

In an embodiment, when the second display area is driven in the charging mode and the illuminance is less than the reference illuminance, a data signal corresponding to a low grayscale less than the high grayscale may be provided to each of the second pixels.

In an embodiment, when the second display area is driven in the charging mode and the illuminance is less than the reference illuminance, a driving time of the second display area may be determined by charging information generated by learning a charging time of the battery.

In an embodiment, when the second display area is driven in the charging mode, the processor may drive the second display area in a way such that a degradation degree of a second pixel disposed in a boundary area of the second display area which is adjacent to the first display area is equal to a degradation degree of a first pixel symmetrically positioned to the second pixel with respect to the boundary line.

In an embodiment, when the second display area is driven in the charging mode, the processor may drive the second display area such that degradation degrees of second pixels disposed in a boundary area of the second display area which is adjacent to the first display area and arranged in a direction crossing the boundary line gradually increase or decrease as being away from the boundary line.

In an embodiment, when the second display area is driven in the charging mode, degradation degrees of the second pixels disposed in the boundary area may gradually increase or decrease from a degradation degree of a first pixel adjacent to the boundary line to the average of degradation degrees of the first pixels included in the first display area as being away from the boundary line.

In an embodiment, the display device may further include a memory which stores accumulated stress data generated based on image data. In such an embodiment, the degradation degrees of the first pixels and the degradation degrees of the second pixels may be calculated using the accumulated stress data.

In an embodiment, the display panel may be a flexible display panel rollable into the housing.

A method of driving a display device including a housing and a display panel inserted into or withdrawn from the housing, where the display panel includes a first display area and a second display area adjacent to the first display area with a boundary line therebetween, according to embodiments, includes driving the first display area in a display mode, in which the display panel displays an image in a state where the first display area is withdrawn from the housing and the second display area is inserted into the housing, calculating a difference between an average of degradation degrees of first pixels included in the first display area and an average of degradation degrees of second pixels included in the second display area in a charging mode in which a battery of the display device is charged, where the battery provides a power to the display panel, and driving the second display area in a way such that the average of the degradation degrees of the second pixels is equal to the average of the degradation degrees of the first pixels in the charging mode.

In an embodiment, when the first display area is driven in the display mode, a data signal corresponding to a minimum grayscale may be provided to each of the second pixels.

In an embodiment, when the first display area is driven in the display mode, the second display area may not be driven.

In an embodiment, when the second display area is driven in the charging mode and an illuminance of an ambient light is greater than a reference illuminance, a data signal corresponding to a high grayscale may be provided to each of the second pixels.

In an embodiment, when the second display area is driven in the charging mode and the illuminance is less than the reference illuminance, a data signal corresponding to a low grayscale less than the high grayscale may be provided to each of the second pixels.

In an embodiment, when the second display area is driven in the charging mode and the illuminance is less than the reference illuminance, a driving time of the second display area may be determined by charging information generated by learning a charging time of the battery.

In an embodiment, when the second display area is driven in the charging mode, the second display area may be driven in a way such that a degradation degree of a second pixel disposed in a boundary area of the second display area which is adjacent to the first display area is equal to a degradation degree of a first pixel symmetrically positioned to the second pixel with respect to the boundary line.

In an embodiment, when the second display area is driven in the charging mode, the second display area may be driven in a way such that degradation degrees of second pixels disposed in a boundary area of the second display area which is adjacent to the first display area and arranged in a direction crossing the boundary line gradually increase or decrease as away from the boundary line.

In an embodiment, in driving the second display area, the degradation degrees of the second pixels disposed in the boundary area may gradually increase or decrease from a degradation degree of a first pixel adjacent to the boundary line to the average of the degradation degrees of the first pixels included in the first display area as being away from the boundary line.

In embodiments of the display device according to the invention, only the first display area may be driven in the display mode in which the display panel displays an image in a state in which the first display area is withdrawn from the housing and the second display area is inserted into the housing, such that power consumption of the display device may be reduced. In such embodiments, the second display area may be driven in the charging mode in which the battery is charged, such that a difference in degradation degree between the first display area and the second display area may decrease.

BRIEF DESCRIPTION OF THE DRAWINGS

Embodiments will be more clearly understood from the following detailed description taken in conjunction with the accompanying drawings.

DETAILED DESCRIPTION

Figure 1:
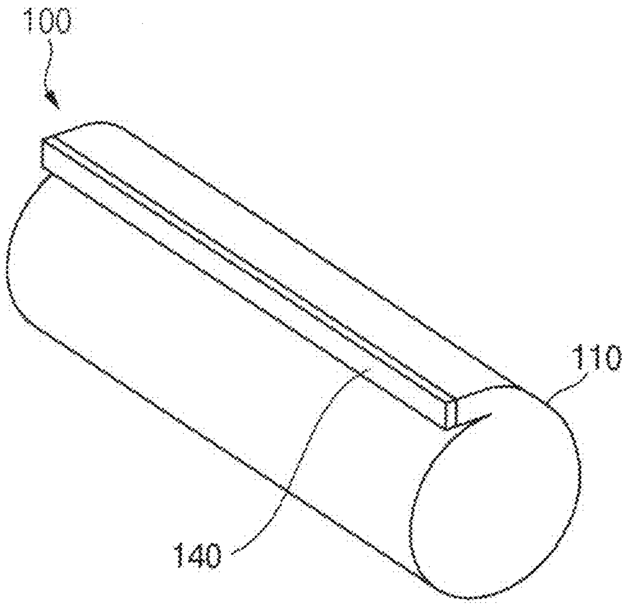
FIG. 1 is a perspective view illustrating a display device in which a display panel is inserted according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises"

and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device and a method of driving a display device according to embodiments of the disclosure will be described in detail with reference to the accompanying drawings.

Figure 2:
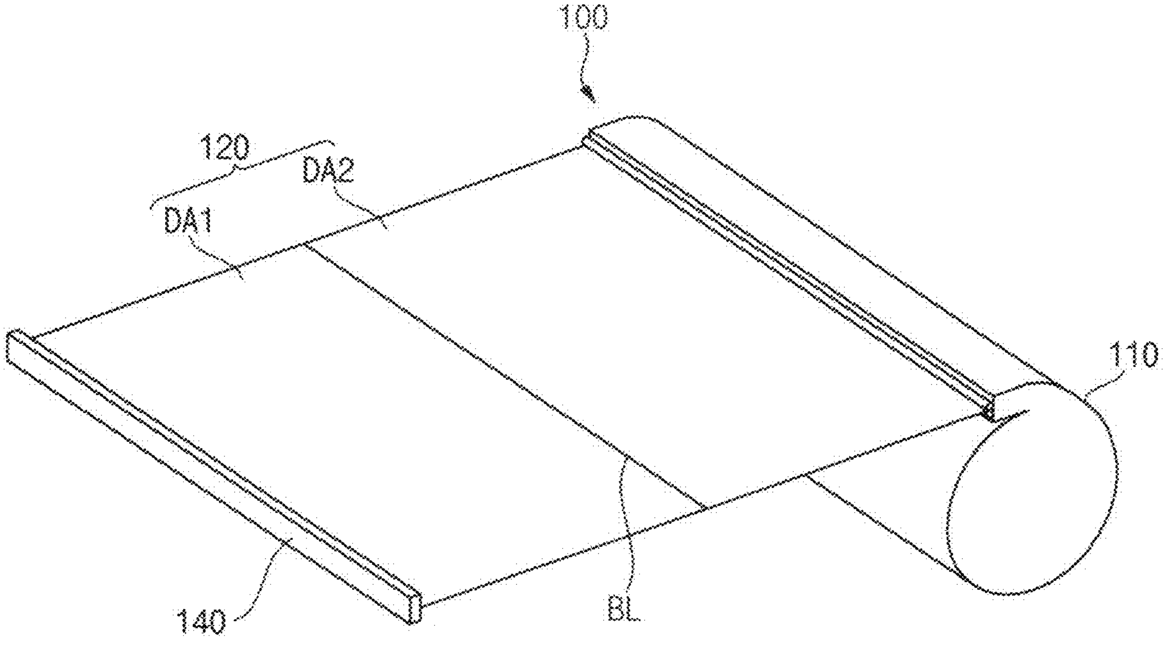
FIG. 2 is a perspective view illustrating a display device in which a display panel is withdrawn according to an embodiment.

FIG. 1 is a perspective view illustrating a display device 100 in which a display panel 120 is inserted according to an embodiment. FIG. 2 is a perspective view illustrating the display device 100 in which the display panel 120 is withdrawn according to an embodiment.

Referring to FIGS. 1 and 2, an embodiment of the display device 100 may include a housing 110, a display panel 120, and a handle 140.

The housing 110 may define an internal space. The display panel 120 may be positioned in the internal space of the housing 110. In an embodiment, the housing 110 may have a pillar shape. In an embodiment, for example, the housing 110 may have a cylindrical shape.

The display panel 120 may be inserted into the housing 110, or may be withdrawn from the housing 110. The display panel 120 may include a display area for displaying an image.

In an embodiment, the display panel 120 may be a flexible display panel which is capable of being rolled into or rolled out of the housing 110. In such an embodiment, the display device 100 may be a rollable display device. The display panel 120 may include a material having a flexible characteristic, such as plastic or the like. Accordingly, although the display panel 120 is bendable like paper, the display panel 120 may maintain display performance.

When a user does not use the display device 100, the display panel 120 may be inserted into the internal space of the housing 110 in a rolled form. When the user uses the display device 100, the display panel 120 may be withdrawn from the housing 110.

The handle 140 may be disposed at an end of the display panel 120. In an embodiment, the handle 140 may have a stick shape.

When the user withdraws the display panel 120 from the housing 110, the user may easily withdraw the display panel 120 from the housing 110 while holding the handle 140. Since the display panel 120 may be withdrawn from the housing 110 while the user does not touch the display panel 120 with a hand, fingerprints, stains, etc. may be prevented from being attached to the display panel 120.

In an embodiment, as illustrated in FIG. 2, when the user withdraws an entirety of the display panel 120 from the housing 110, the display area of the display panel 120 may be exposed to the user. In this state, the user may view a relatively large image through the display area of the display panel 120.

Figure 3:
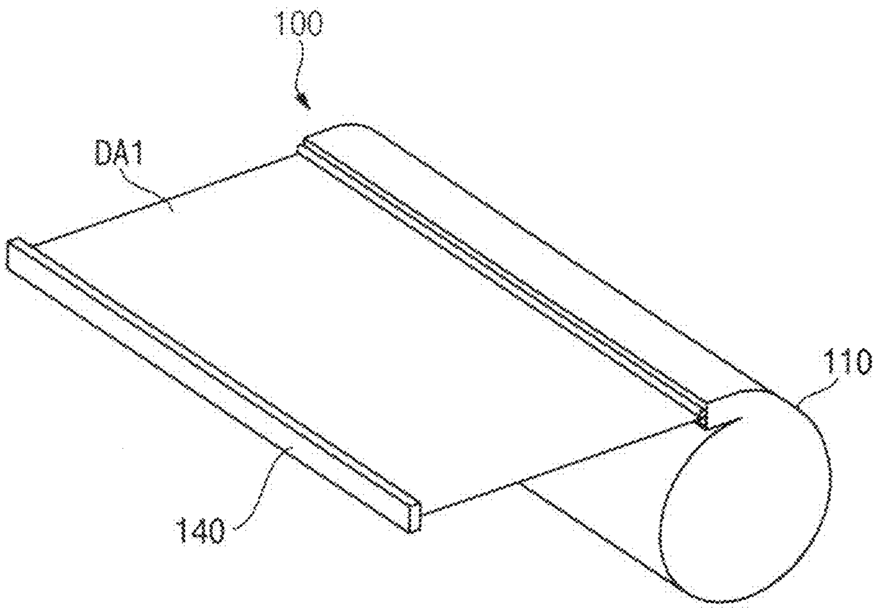
FIG. 3 is a perspective view illustrating a display device in which a first display area of a display panel is withdrawn and a second display area of the display panel is inserted according to an embodiment.

FIG. 3 is a perspective view illustrating the display device 100 in which a first display area DA1 of the display panel 120 is withdrawn and a second display area DA2 of the display panel 120 is inserted according to an embodiment.

Referring to FIG. 3, when the user withdraws a portion of the display panel 120 from the housing 110, a first portion of the display area of the display panel 120 may be exposed to the user, and a second portion of the display area of the display panel 120 may not be exposed to the user. In this state, the user may view a relatively small image through the first portion of the display area of the display panel 120.

In an embodiment, as shown in FIGS. 2 and 3 and as described above with reference to FIG. 3, the first portion of the display area of the display panel 120 withdrawn from the housing 110 may be defined as the first display area DA1, and the second portion of the display area of the display panel 120 inserted into the housing 110 may be defined as the second display area DA2. The second display area DA2 may be adjacent to the first display area DA1 with a boundary line BL therebetween. The first display area DA1 may be adjacent to the handle 140, and the second display area DA2 may be spaced apart from the handle 140 with the first display area DA1 interposed therebetween. When the display panel 120 is withdrawn from the housing 110, the second display area DA2 may be withdrawn after the first display area DA1 is withdrawn. When the display panel 120 is inserted into the housing 110, the first display area DA1 may be inserted after the second display area DA2 is inserted.

Figure 4:
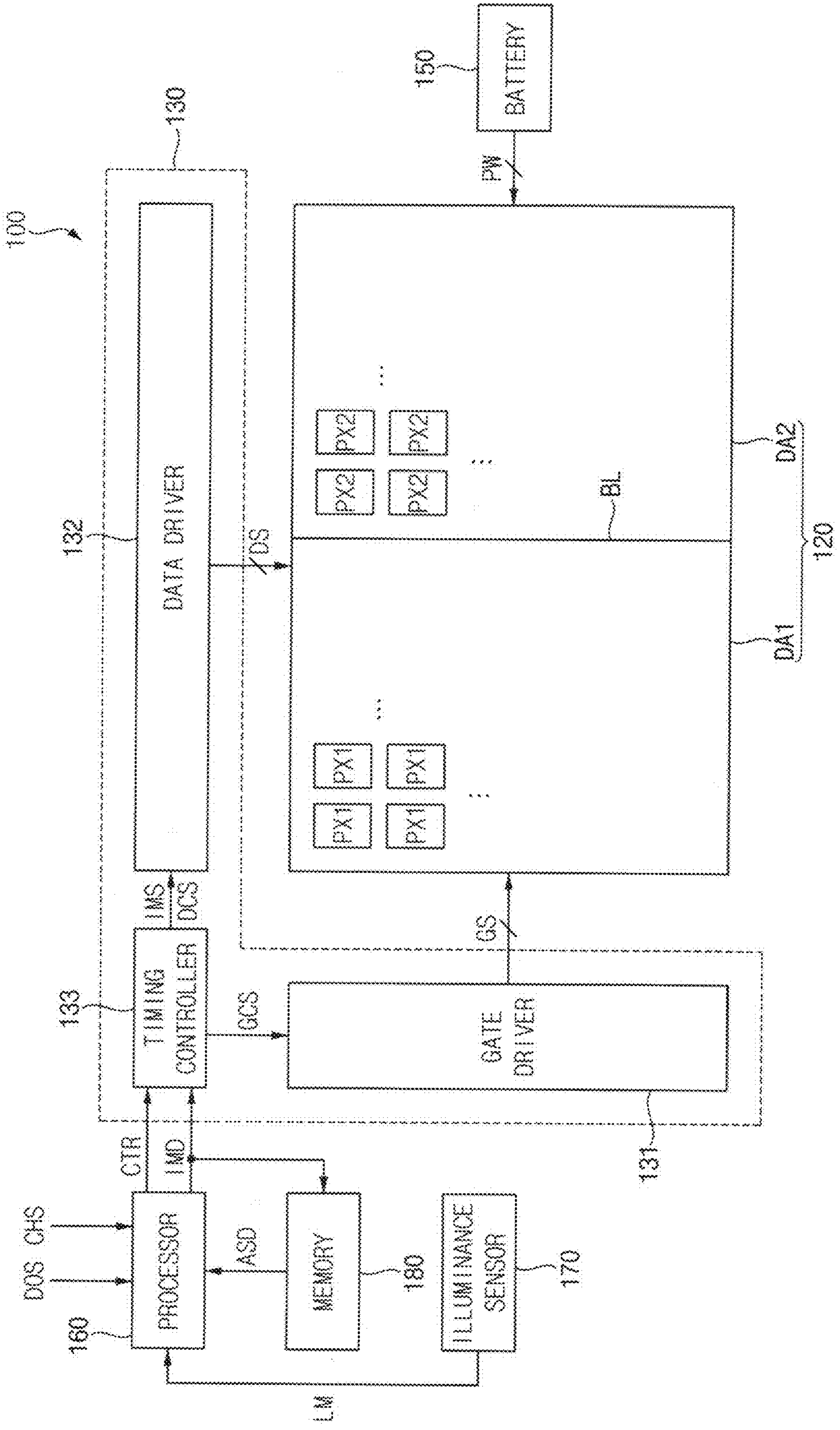
FIG. 4 is a block diagram illustrating a display device according to an embodiment.

FIG. 4 is a block diagram illustrating the display device 100 according to an embodiment.

Referring to FIG. 4, an embodiment of the display device 100 may include the display panel 120, a panel driver 130, a battery 150, a processor 160, an illuminance sensor 170, and a memory 180.

The display panel 120 may include various display elements such as an organic light emitting diode (OLED) or the like. Hereinafter, embodiments where the display panel 120 including the OLED as a display element thereof will be described for convenience. However, the disclosure is not limited thereto, and alternatively the display panel 120 may include other various display elements such as a liquid crystal display (LCD) element, an electrophoretic display (EPD) element, an inorganic light emitting diode, a quantum dot light emitting diode, etc.

The display panel 120 may include the first display area DA1 and the second display area DA2. The first display area DA1 may include a plurality of first pixels PX1, and the second display area DA2 may include a plurality of second pixels PX2. The first and second pixels PX1 and PX2 may receive gate signals GS and data signals DS. The first and second pixels PX1 and PX2 may emit light based on the gate signals GS and the data signals DS.

The panel driver 130 may include a gate driver 131, a data driver 132, and a timing controller 133.

The gate driver 131 (or scan driver) may generate the gate signals (or scan signals) GS based on a gate control signal GCS, and may provide the gate signals GS to the first and second pixels PX1 and PX2. The gate control signal GCS may include a gate start signal, a gate clock signal, or the like.

The data driver 132 (or source driver) may generate the data signals DS based on an image signal IMS and a data control signal DCS, and may provide the data signals DS to the first and second pixels PX1 and PX2. The data control signal DCS may include a data clock signal, a data enable signal, or the like.

The timing controller 133 may control a driving of the gate driver 131 and a driving of the data driver 132. The timing controller 133 may generate the image signal IMS, the gate control signal GCS, and the data control signal DCS based on image data IMD and a control signal CTR. The timing controller 133 may provide the gate control signal GCS to the gate driver 131, and may provide the image signal IMS and the data control signal DCS to the data driver 132.

The battery 150 may provide power PW to the display panel 120. When the display device 100 is connected to an external power supply, the battery 150 may be charged. When a charging of the battery 150 starts or ends, a charging signal CHS indicating a charging start of the battery 150 or a charging end of the battery 150 may be provided to the processor 160.

The illuminance sensor 170 may sense an illuminance LM of ambient light of the display device 100. The illuminance sensor 170 may provide the illuminance LM of the ambient light to the processor 160.

The processor 160 may drive the display panel 120. The processor 160 may provide the image data IMD and the control signal CTR to the timing controller 133 to drive the display panel 120.

When the display panel 120 is withdrawn from the housing 110 or inserted into the housing 110, a withdrawal signal DOS indicating a withdrawal state of the display panel 120 may be provided to the processor 160. The withdrawal state of the display panel 120 may include a state in which the display panel 120 is inserted, a state in which an entirety of the display panel 120 is withdrawn, a state in which the first display area DA1 is withdrawn and the second display area DA2 is inserted, or the like. The processor 160 may determine the withdrawal state of the display panel 120 based on the withdrawal signal DOS.

The processor 160 may determine a charging start time and a charging end time of the display panel 120 based on the charging signal CHS. The processor 160 may determine an ambient brightness of the display device 100 based on the illuminance LM of the ambient light.

The memory 180 may store accumulated stress data ASD generated based on the image data IMD. The accumulated stress data ASD may include accumulated stress values of the first and second pixels PX1 and PX2. The memory 180 may provide the accumulated stress data ASD to the processor 160.

Figure 5:
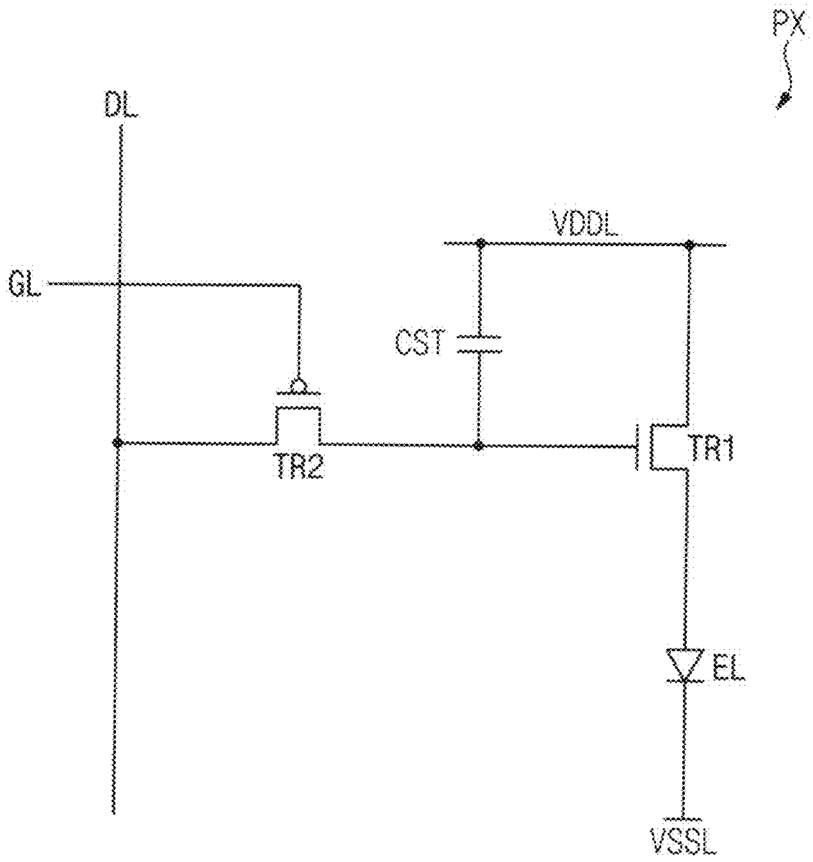
FIG. 5 is a circuit diagram illustrating a pixel according to an embodiment.

FIG. 5 is a circuit diagram illustrating the pixel PX according to an embodiment. The pixel PX shown in FIG. 5 may correspond to one of the first and second pixels PX1 and PX2 in FIG. 4.

Referring to FIG. 5, an embodiment of the pixel PX may include a first transistor TR1, a second transistor TR2, a storage capacitor CST, and a light emitting element EL.

The first transistor TR1 may provide a driving current to the light emitting element EL. A first electrode of the first transistor TR1 may be connected to a first power line VDDL that transmits a first driving voltage, and a second electrode of the first transistor TR1 may be connected to a first electrode of the light emitting element EL. A gate electrode of the first transistor TR1 may be connected to a second electrode of the second transistor TR2.

The second transistor TR2 may provide the data signal DS to the gate electrode of the first transistor TR1 in response to the gate signal GS. A first electrode of the second transistor TR2 may be connected to a data line DL that transmits the data signal DS, and the second electrode of the second transistor TR2 may be connected to the gate electrode of the first transistor TR1. A gate electrode of the second transistor TR2 may be connected to a gate line GL that transmits the gate signal GS.

FIG. 2 illustrates an embodiment in which each of the first transistor TR1 and the second transistor TR2 is a p-type metal-oxide-semiconductor (PMOS) transistor, but the disclosure is not limited thereto. In an alternative embodiment, at least one of the first transistor TR1 and the second transistor TR2 may be an n-type metal-oxide-semiconductor (NMOS) transistor.

The storage capacitor CST may maintain a voltage of the gate electrode of the first transistor TR1. A first electrode of the storage capacitor CST may be connected to the gate electrode of the first transistor TR1, and a second electrode of the storage capacitor CST may be connected to the first power line VDDL.

The light emitting element EL may emit light based on the driving current. The first electrode of the light emitting element EL may be connected to the second electrode of the first transistor TR1, and a second electrode of the light emitting element EL may be connected to a second power line VSSL that transmits a second driving voltage.

Hereinafter, operations of the display device 100 according to embodiments will be described with reference to FIGS. 6 to 10. In the embodiments described with reference to FIGS. 6 to 10, the display device 100 is in a display mode DM in which the display panel 120 displays an image in a state where the first display area DA1 is withdrawn from the housing 110 and the second display area DA2 is inserted into the housing 110 as illustrated in FIG. 3.

Figure 6:
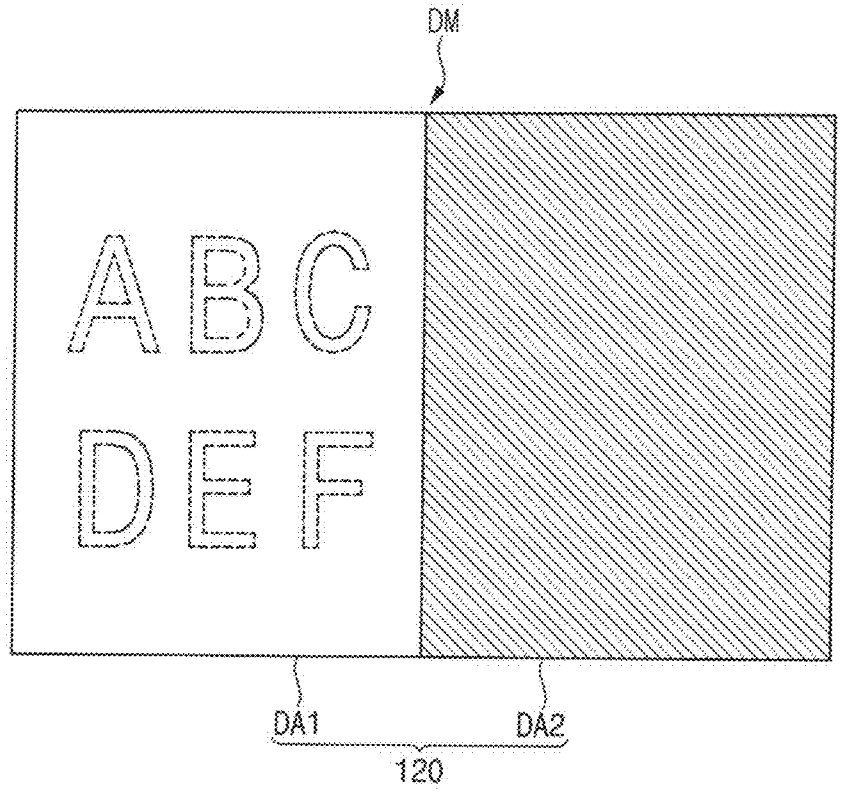
FIG. 6 is a diagram for describing a display mode according to an embodiment.

FIG. 6 is a diagram for describing the display mode DM according to an embodiment.

Referring to FIGS. 4 and 6, the processor 160 may drive the first display area DA1 in the display mode DM. In this mode, the image data IMD corresponding to the first display area DA1 may include an image for being viewed by the user, and the image may be displayed in the first display area DA1.

In an embodiment, the processor 160 may not drive the second display area DA2 in the display mode DM. In such an embodiment, the processor 160 may provide the image data IMD and the control signal CTR to the timing controller 133 for not displaying the image in the second display area DA2. Accordingly, the gate driver 131 may not provide the gate signal GS to each of the second pixels PX2, or the data driver 132 may not provide the data signal DS to each of the second pixels PX2.

In an alternative embodiment, a data signal DS corresponding to a minimum grayscale may be provided to each of the second pixels PX2 in the display mode DM. In an embodiment, for example, where grayscales displayed by the display panel 120 includes 0 grayscale to 255 grayscale, the minimum grayscale may be 0 grayscale. In such an embodiment, the processor 160 may provide image data IMD for displaying an image corresponding to the minimum grayscale in the second display area DA2 to the timing controller 133. Accordingly, the data driver 132 may provide the data signal DS corresponding to the minimum grayscale to each of the second pixels PX2.

In the display mode DM in which the display panel 120 displays an image in the state where the first display area DA1 is withdrawn from the housing 110 and the second display area DA2 is inserted into the housing 110, the second display area DA2 may not display an image, or the second display area DA2 may display the image corresponding to the minimum grayscale, so that power consumption of the display device 100 in the display mode DM will be reduced.

Figure 7:
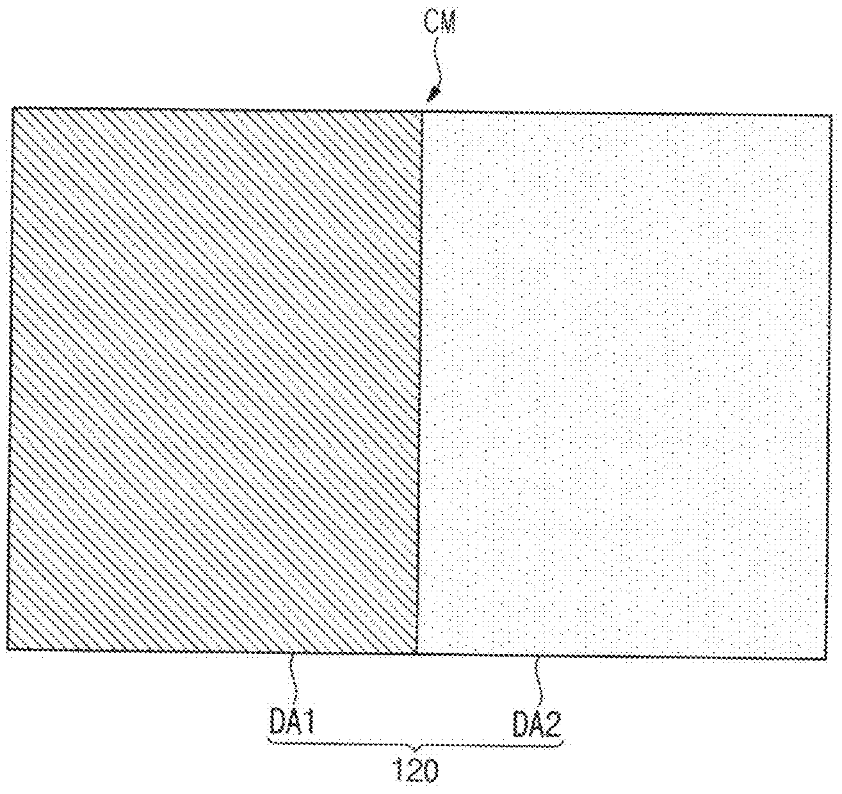
FIG. 7 is a diagram for describing a charging mode according to an embodiment.

FIG. 7 is a diagram for describing a charging mode CM according to an embodiment.

Referring to FIG. 7, the processor 160 may drive the second display area DA2 in the charging mode CM in which the battery 150 is charged. In this state, the image data IMD corresponding to the second display area DA2 may include an image for degrading the second display area DA2, and the image may be displayed in the second display area DA2.

In an embodiment, the processor 160 may not drive the first display area DA1 in the charging mode CM. In such an embodiment, the processor 160 may provide the image data IMD and the control signal CTR for not displaying an image in the first display area DA1 to the timing controller 133. Accordingly, the gate driver 131 may not provide the gate signal GS to each of the first pixels PX1, or the data driver 132 may not provide the data signal DS to each of the first pixels PX1.

In an alternative embodiment, the data signal DS corresponding to the minimum grayscale may be provided to each of the first pixels PX1 in the charging mode CM. In such an embodiment, the processor 160 may provide the image data IMD for displaying an image corresponding to the minimum grayscale in the first display area DA1 to the timing controller 133. Accordingly, the data driver 132 may provide the data signal DS corresponding to the minimum grayscale to each of the first pixels PX1.

In an embodiment, in the charging mode CM, the display panel 120 may be inserted into the housing 110. However, the disclosure is not limited thereto, and in an alternative embodiment, in the charging mode CM, the display panel 120 may be withdrawn from the housing 110, or the first display area DA1 may be withdrawn from the housing 110 and the second display area DA2 may be inserted into the housing 110.

The processor 160 may drive the second display area DA2 in a way such that an average of degradation degrees of the second pixels PX2 included in the second display area DA2 is equal to an average of degradation degrees of the first pixels PX1 included in the first display area DA1 in the charging mode CM. The average of the degradation degrees of the first pixels PX1 may mean a degradation degree of the first display area DA1, and the average of the degradation degrees of the second pixels PX2 may mean a degradation degree of the second display area DA2. A degradation degree of the pixel PX may mean a degradation degree of the light emitting element EL included in the pixel PX. In an embodiment, for example, the degradation degree of the light emitting element EL may be proportional to a luminance of light emitted from the light emitting element EL and a driving time of the light emitting element EL.

The degradation degrees of the first pixels PX1 and the degradation degrees of the second pixels PX2 may be calculated using the accumulated stress data ASD. In the display mode DM, since the first display area DA1 is driven and the second display area DA2 is not driven or displays an image corresponding to the minimum grayscale, the degradation degree of the first display area DA1 may be greater than the degradation degree of the second display area DA2. Accordingly, the second display area DA2 may be driven in a way such that the degradation degree of the second display area DA2 is equal to the degradation degree of the first display area DA1 in the charging mode CM. Accordingly, in such an embodiment, a difference in the degradation degree between the first display area DA1 and the second display area DA2 may decrease.

Figure 8:
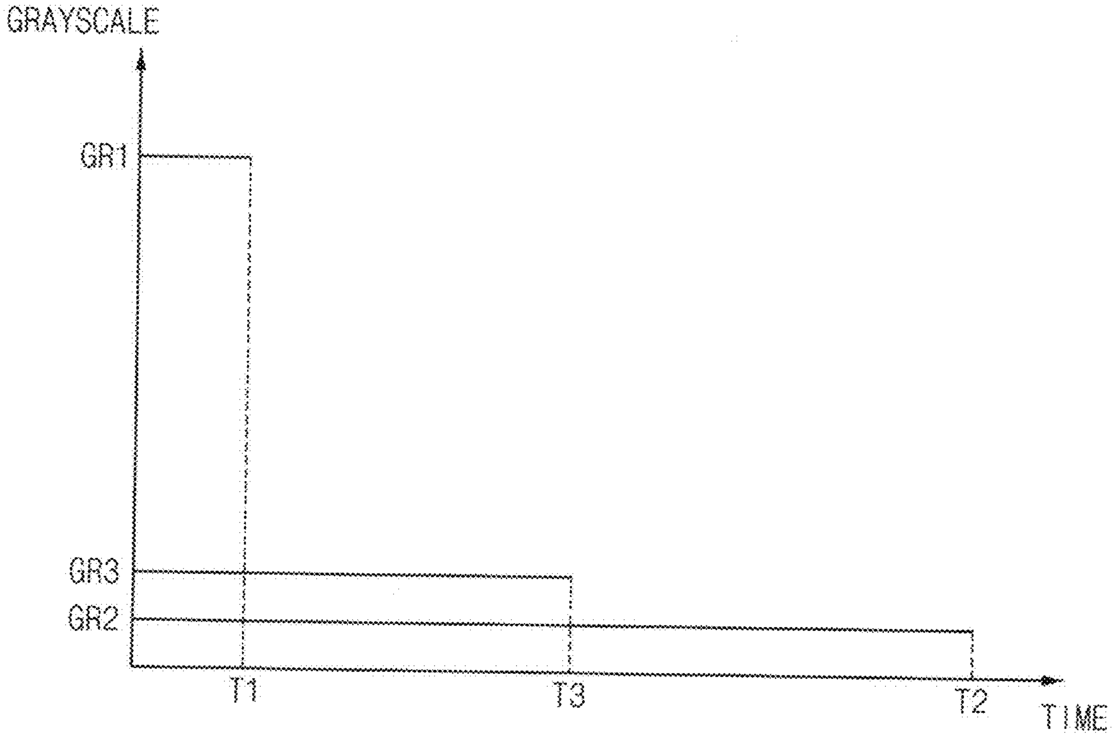
FIG. 8 is a graph for describing a driving of a second display area in a charging mode according to an embodiment.

FIG. 8 is a graph for describing a driving of the second display area DA2 in the charging mode CM according to an embodiment.

Referring to FIG. 8, the degradation degree of the pixel PX may be proportional to a grayscale (driving grayscale) corresponding to the data signal DS provided to the pixel PX and a time (driving time) during which the pixel PX is driven. A degradation degree of the pixel PX when the pixel PX is driven with a relatively high first grayscale GR1 for a relatively short first time T1, a degradation degree of the pixel PX when the pixel PX is driven with a relatively low second grayscale GR2 for a relatively long second time T2, and a degradation degree of the pixel PX when the pixel PX is driven with a third grayscale GR3 lower than the first grayscale GR1 and higher than the second grayscale GR2 for a third time T3 longer than the first time T1 and shorter than the second time T2 may be substantially equal to each other. For example, in the graph of FIG. 8, an area of a rectangle defined by the first grayscale GR1 and the first time T1, an area of a rectangle defined by the second grayscale GR2 and the second time T2, and an area of a rectangle defined by the third grayscale GR3 and the third time T3 may be substantially equal to each other. Accordingly, the driving grayscale and the driving time of the pixel PX may be determined based on conditions such as the illuminance LM of the ambient light of the display device 100, the charging time of the battery 150, or the like in the charging mode CM.

When the illuminance LM is greater than a preset reference illuminance in the charging mode CM, a data signal DS corresponding to a high grayscale may be provided to each of the second pixels PX2. In an embodiment, for example, a data signal DS corresponding to the first grayscale GR1 greater than 200 grayscale and less than or equal to 255 grayscale may be provided to each of the second pixels PX2. In this case, each of the second pixels PX2 may be driven for the first time T1.

When the illuminance LM is greater than the reference illuminance, although the second display area DA2 displays an image having a relatively high luminance, the user may not recognize the image. Further, as the grayscale increases, a voltage of the first transistor TR1 becomes relatively smaller than a voltage of the light emitting element EL, so that power consumption due to a driving of the second display area DA2 may be reduced.

When the illuminance LM is less than the reference illuminance in the charging mode CM, a data signal DS corresponding to a low grayscale lower than the high grayscale may be provided to each of the second pixels PX2. In an embodiment, for example, a data signal DS corresponding to a grayscale greater than 0 grayscale and less than or equal to 50 grayscale may be provided to each of the second pixels PX2. In this case, each of the second pixels PX2 may be driven for a relatively long time.

When the illuminance LM is smaller than the reference illuminance, if the second display area DA2 displays an image having a relatively high luminance, the user may recognize the image. For example, if the second display area DA2 displays an image having a relatively high luminance during a sleep time of the user, sleep of the user may be disturbed by the image displayed by the second display area DA2 having a relatively high luminance.

When the illuminance LM is less than the reference illuminance in the charging mode CM, the driving time of the second display area DA2 may be determined by charging information generated by learning the charging time of the battery 150. When the charging of the battery 150 starts or ends, the charging signal CHS related to the charging start and the charging end of the battery 150 may be provided to the processor 160, and the processor 160 may generate the charging information by learning the charging time of the battery 150 based on the charging signal CHS. The processor 160 may control the driving time of the second display area DA2 by using the charging information.

In an embodiment, when the charging time of the battery 150 is relatively long, the processor 160 may drive the second display area DA2 for the second time T2, and may provide the data signal DS corresponding to the second grayscale GR2 to each of the second pixels PX2. In an alternative embodiment, when the charging time of the battery 150 is relatively short, the processor 160 may drive the second display area DA2 for the third time T3, and may provide the data signal DS corresponding to the third grayscale GR3 to each of the second pixels PX2.

Figure 9:
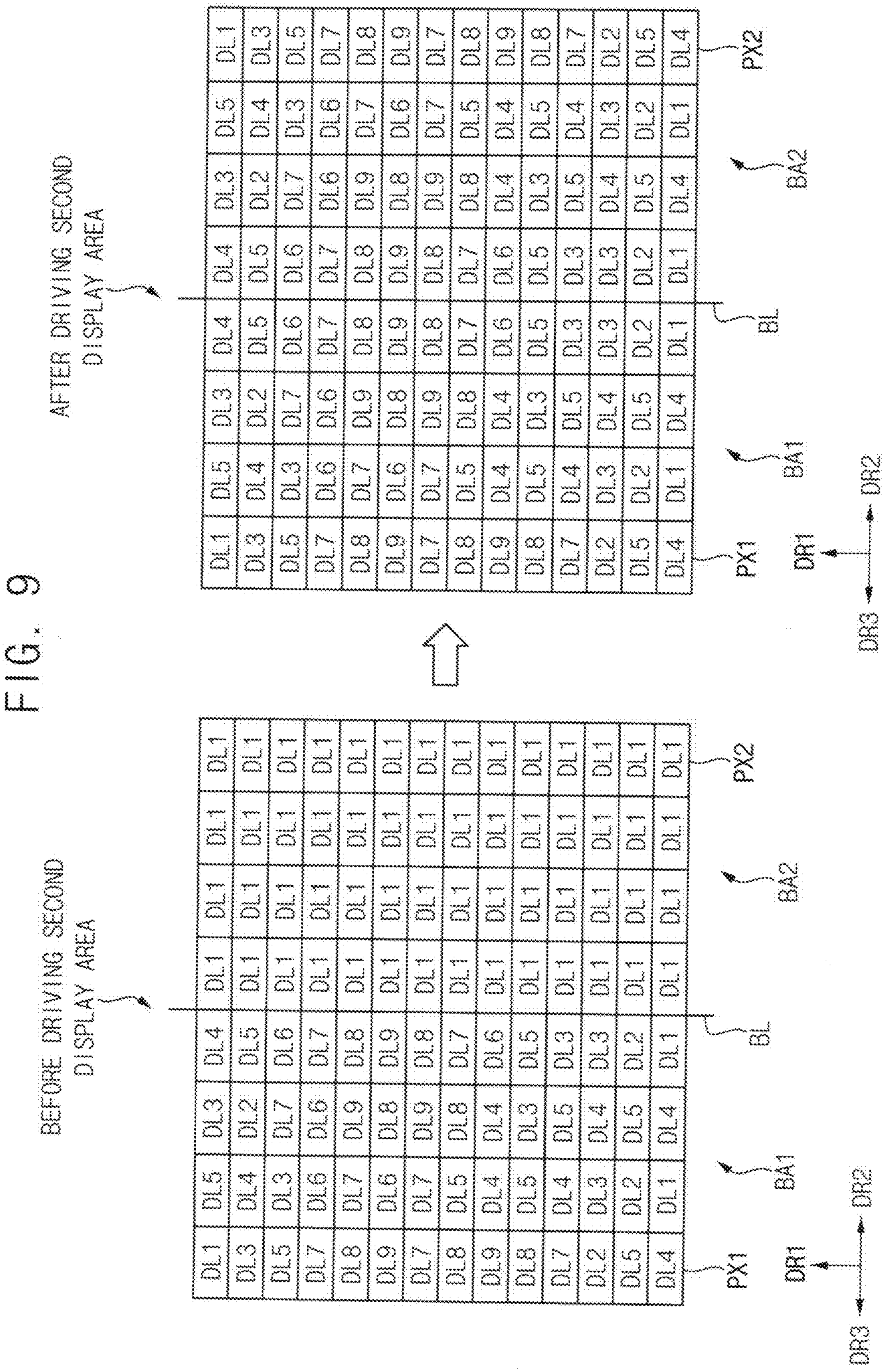
FIG. 9 is a diagram for describing a driving of a second boundary area in a charging mode according to an embodiment.

FIG. 9 is a diagram for describing a driving of a second boundary area BA2 in the charging mode CM according to an embodiment.

Referring to FIG. 9, since the first pixels PX1 emit light based on data signals DS corresponding to different grayscales in the display mode DM, the degradation degrees of the first pixels PX1 may be different from each other. In an embodiment, the degradation degree of the pixel PX may be divided into nine degradation levels DL1 to DL9. The degradation degree of the pixel PX may increase from a first degradation level DL1 to a ninth degradation level DL9. However, the present disclosure is not limited thereto, and alternatively, the degradation degree of the pixel PX may be divided into 2 to 8 or 10 or more degradation levels.

When the processor 160 drives the second display area DA2 in a way such that the degradation degrees of the second pixels PX2 are equal to the average of the degradation degrees of the first pixels PX1 in the charging mode CM, the degradation degree of the first pixel PX1 and the degradation degree of the second pixel PX2 may rapidly change at the boundary line BL therebetween. In an embodiment, for example, where the average of the degradation degrees of the first pixels PX1 is a fifth degradation level DL5, the degradation degrees of the second pixels PX2 may be the fifth degradation level DL5 after the second display area DA2 is driven in the charging mode CM, and since the degradation degrees of the first pixels PX1 are different from each other and the degradation degrees of the second pixels PX2 are equal to each other, the degradation degree of the first pixel PX1 and the degradation degree of the second pixel PX2 may rapidly change at the boundary line BL therebetween. When the degradation degree of the first pixel PX1 and the degradation degree of the second pixel PX2 rapidly changes with the boundary line BL therebetween, the user may recognize the boundary line BL between the first display area DA1 and the second display area DA2.

In an embodiment, the processor 160 may drive the second display area DA2 in a way such that a degradation degree of a second pixel PX2 disposed in a second boundary area BA2 is equal to a degradation degree of a first pixel PX1 symmetrically positioned to the second pixel PX2 with respect to the boundary line BL in the charging mode CM. Here, a first boundary area BA1 may be an area of the first display area DA1 which is adjacent to the second display area DA2, and the second boundary area BA2 may be an area of the second display area DA2 which is adjacent to the first display area DA1. In an embodiment, for example, degradation degrees of second pixels PX2 disposed in the second boundary area BA2 before driving of the second display area DA2 may be the first degradation level DL1.

The degradation degree of the second pixel PX2 disposed in the second boundary area BA2 after the driving of the second display area may be equal to the degradation degree of the first pixel PX1 symmetrically positioned to the second pixel PX2 with respect to the boundary line BL. In an embodiment, for example, in a first pixel row in a first direction DR1, which is a direction in which the boundary line BL extends, degradation degrees DL1, DL4, DL1, and DL4 of the second pixels PX2 arranged in a second direction DR2 crossing the first direction DR1 from the boundary line BL may be respectively equal to degradation degrees DL1, DL4, DL1, and DL4 of the first pixels PX1 arranged in a third direction DR3 opposite to the second direction DR2 from the boundary line BL.

The degradation degree of the second pixel PX2 disposed in the second boundary area BA2 may be equal to the degradation degree of the first pixel PX1 symmetrically positioned to the second pixel PX2 with respect to the boundary line BL after the driving of the second display area DA2, such that the user may not recognize the boundary line BL between the first display area DA1 and the second display area DA2 after the driving of the second display area DA2.

Figure 10:
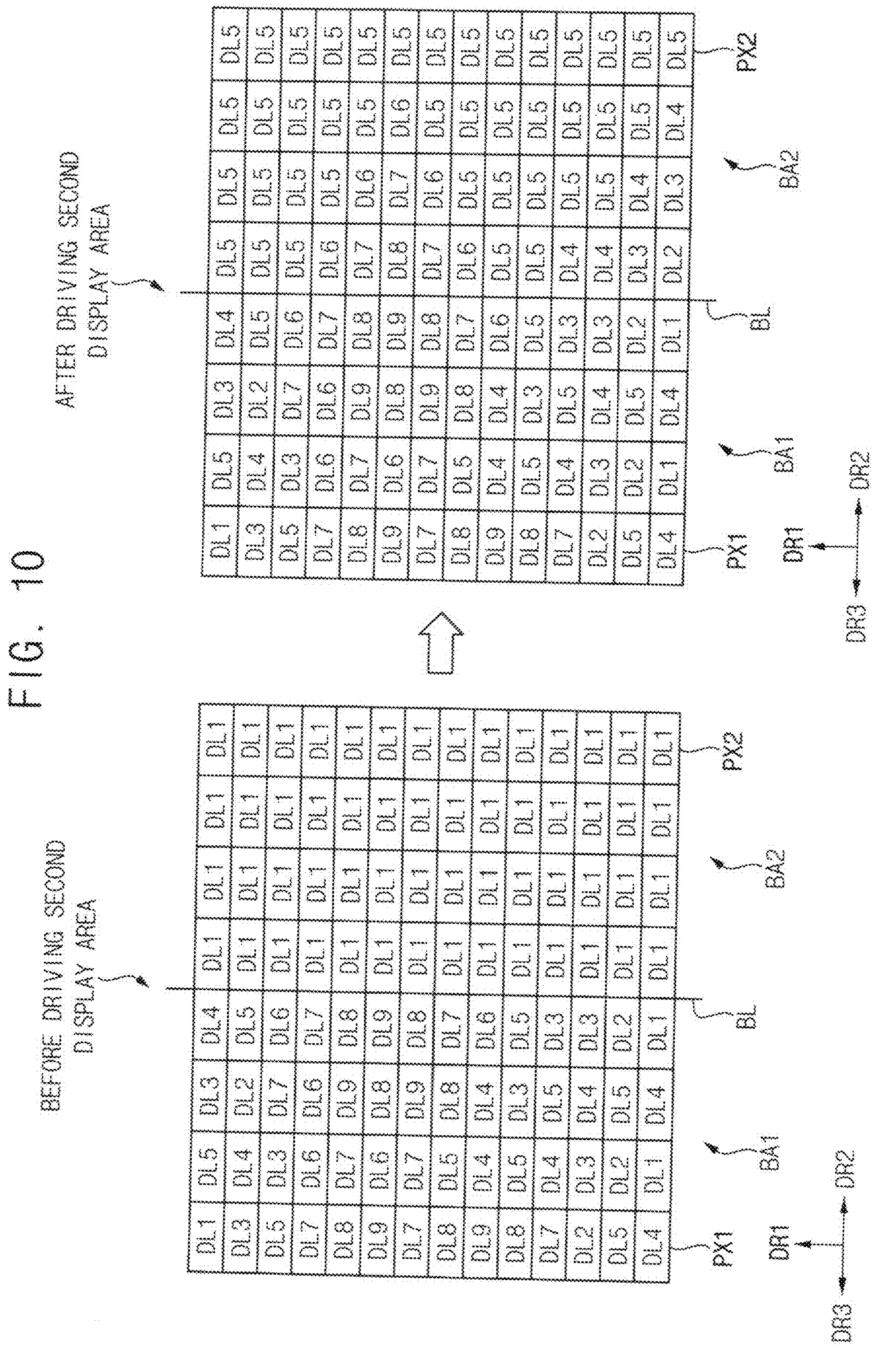
FIG. 10 is a diagram for describing a driving of a second boundary area in a charging mode according to an embodiment.

FIG. 10 is a diagram for describing a driving of the second boundary area BA2 in the charging mode CM according to an embodiment.

Referring to FIG. 10, in an embodiment, the processor 160 may drive the second display area DA2 in a way such that degradation degrees of second pixels PX2 disposed in the second boundary area BA2 and arranged in a direction crossing the boundary line BL gradually increase or decrease as being away from the boundary line BL in the charging mode CM. In an embodiment, for example, the degradation degrees of the second pixels PX2 disposed in the second boundary area BA2 before driving of the second display area DA2 may be the first degradation level DL1.

The degradation degrees of the second pixels PX2 disposed in the second boundary area BA2 and arranged in the direction crossing the boundary line BL may gradually increase or decrease as being away from the boundary line BL after the driving of the second display area DA2. Specifically, the degradation degrees of the second pixels PX2 disposed in the second boundary area BA2 and arranged in the direction crossing the boundary line BL may gradually increase or decrease from a degradation degree of a first pixel PX1 adjacent to the boundary line BL to the average of the degradation degrees of the first pixels PX1 included in the first display area DA1 as being away from the boundary line BL after the driving of the second display area DA2. In an embodiment, for example, where the average of the degradation degrees of the first pixels PX1 included in the first display area DA1 is the fifth degradation level DL5, in the first pixel row in the first direction DR1, degradation degrees DL2, DL3, DL4, and DL5 of the second pixels PX2 arranged in the second direction DR2 from the boundary line BL may gradually increase from the degradation degree DL1 of the first pixel PX1 adjacent to the boundary line BL to the average DL5 of the degradation degrees of the first pixels PX1 included in the first display area DA1. Further, in the ninth pixel row in the first direction DR1, degradation degrees DL8, DL7, DL6, and DL5 of the second pixels PX2 arranged in the second direction DR2 from the boundary line BL may gradually decrease from the degradation degree DL9 of the first pixel PX1 adjacent to the boundary line BL to the average DL5 of the degradation degrees of the first pixels PX1 included in the first display area DA1.

The degradation degrees of the second pixels PX2 disposed in the second boundary area BA2 may gradually increase or decrease as being in the direction away from the boundary line BL after the driving of the second display area DA2, such that the user may not recognize the boundary line BL between the first display area DA1 and the second display area DA2 after the driving of the second display area DA2.

Figure 11:
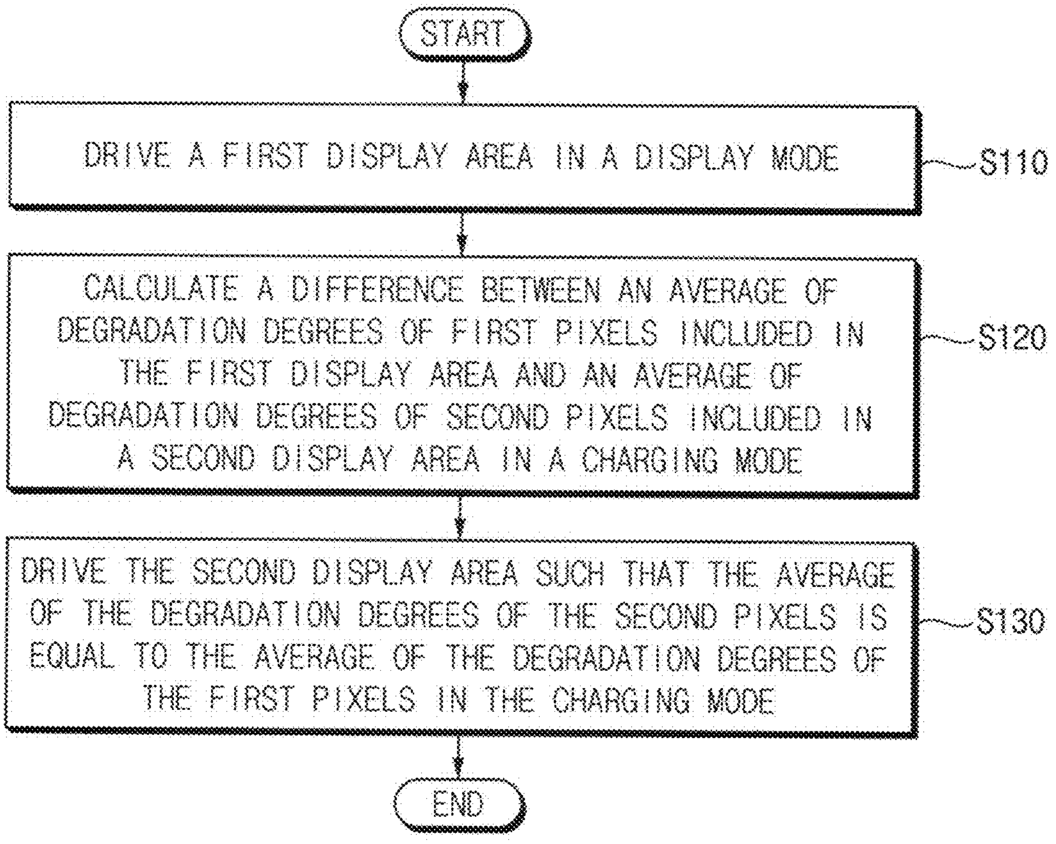
FIG. 11 is a flowchart illustrating a method of driving a display device according to an embodiment.

FIG. 11 is a flowchart illustrating a method of driving a display device according to an embodiment.

Referring to FIG. 11, the first display area DA1 may be driven in the display mode DM in which the display panel 120 displays an image in a state where the first display area DA1 of the display panel 120 is withdrawn from the housing 110 and the second display area DA2 of the display panel 120 is inserted into the housing 110 (S110). When the first display area DA1 is driven, the first display area DA1 may display an image for being viewed by the user.

In an embodiment, in driving the first display area DA1 in the display mode DM (S110), the second display area DA2 may not be driven. In such an embodiment, the gate signal GS or the data signal DS may not be provided to each of the second pixels PX2 included in the second display area DA2. Accordingly, the second display area DA2 may not display an image in the display mode DM.

In an alternative embodiment, in driving the first display area DA1 in the display mode DM (S110), the data signal DS corresponding to the minimum grayscale may be provided to each of the second pixels PX2. Accordingly, the second display area DA2 may display an image corresponding to the minimum grayscale in the display mode DM.

In the charging mode CM in which the battery 150 is charged, a difference between the average of the degradation degrees of the first pixels PX1 included in the first display area DA1 and the average of the degradation degrees of the second pixels PX2 included in the second display area DA2 may be calculated (S120). The average of the degradation degrees of the first pixels PX1 and the average of the degradation degrees of the second pixels PX2 may be calculated using the accumulated stress data ASD.

In the charging mode CM, the second display area DA2 may be driven such that the average of the degradation degrees of the second pixels PX2 is equal to the average of the degradation degrees of the first pixels PX1 (S130). When the second display area DA2 is driven, the second display area DA2 may display an image for degrading the second display area DA2.

In an embodiment, in driving the second display area DA2 in the charging mode CM (S130), the first display area DA1 may not be driven. In such an embodiment, the gate signal GS or the data signal DS may not be provided to each of the first pixels PX1 included in the first display area DA1. Accordingly, in the charging mode CM, the first display area DA1 may not display an image.

In an alternative embodiment, in driving the second display area DA2 in the charging mode CM (S130), the data signal DS corresponding to the minimum grayscale may be provided to each of the first pixels PX1. Accordingly, the first display area DA1 may display an image corresponding to the minimum grayscale in the charging mode CM.

In driving the second display area DA2 in the charging mode CM (S130), when the illuminance LM is greater than a preset reference illuminance, the data signal DS corresponding to a high grayscale may be provided to each of the second pixels PX2. In this case, each of the second pixels PX2 may be driven for a relatively short time.

In driving the second display area DA2 in the charging mode CM (S130), when the illuminance LM is less than the reference illuminance, the data signal DS corresponding to a low grayscale lower than the high grayscale may be provided to each of the second pixels PX2. In this case, each of the second pixels PX2 may be driven for a relatively long time.

In driving the second display area DA2 in the charging mode CM (S130), when the illuminance LM is less than the reference illuminance, the driving time of the second display area DA2 may be determined by the charging information generated by learning the charging time of the battery 150.

In an embodiment, in driving the second display area DA2 in the charging mode CM (S130), the second display area DA2 may be driven such that a degradation degree of a second pixel PX2 disposed in the second boundary area BA2 is equal to a degradation degree of a first pixel PX1 symmetrically positioned to the second pixel PX2 with respect to the boundary line BL. After the second display area DA2 is driven, the degradation degree of the second pixel PX2 disposed in the second boundary area BA2 may be equal to the degradation degree of the first pixel PX1 symmetrically positioned to the second pixel PX2 with respect to the boundary line BL.

In an alternative embodiment, in driving the second display area DA2 in the charging mode CM (S130), the second display area DA2 may be driven such that degradation degrees of second pixel PX2 disposed in the second boundary area BA2 and arranged in a direction crossing the boundary line BL gradually increase or decrease as being away from the boundary line BL. After the second display area DA2 is driven, the degradation degrees of the second pixel PX2 disposed in the second boundary area BA2 and arranged in the direction crossing the boundary line BL may gradually increase or decrease as being away from the boundary line BL. Specifically, after the second display area DA2 is driven, the degradation degrees of the second pixel PX2 disposed in the second boundary area BA2 and arranged in the direction crossing the boundary line BL may gradually increase or decrease from a degradation degree of a first pixel PX1 adjacent to the boundary line BL to the average of the degradation degrees of the first pixels PX1 included in the first display area DA1 as being away from the boundary line BL.

The display device according to the embodiments may be applied to any electronic device having a display function or a display device included in a computer, a notebook, a mobile phone, a smart phone, a smart pad, a portable media player (PMP), a personal digital assistance (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a housing;

a display panel inserted into or withdrawn from the housing, wherein the display panel includes a first display area and a second display area adjacent to the first display area with a boundary line therebetween;

a battery which provides a power to the display panel; and a processor which drives the first display area in a display mode, in which the display panel displays an image in a state where the first display area is withdrawn from the housing and the second display area is inserted into the housing, wherein the processor drives the second display area in a charging mode, in which the battery is charged, in a way such that an average of degradation degrees of second pixels included in the second display area is equal to an average of degradation degrees of first pixels included in the first display area, and wherein a driving grayscale and a driving time of the second display area in the charging mode is determined based on an illuminance of an ambient light and a charging time of the battery.

2. The display device of claim 1, wherein, when the first display area is driven in the display mode, a data signal corresponding to a minimum grayscale is provided to each of the second pixels.

3. The display device of claim 1, wherein when the first display area is driven in the display mode, the processor does not drive the second display area.

4. The display device of claim 1, further comprising:

an illuminance sensor which senses the illuminance of the ambient light, wherein, when the second display area is driven in the charging mode and the illuminance is greater than a reference illuminance, a data signal corresponding to a high grayscale is provided to each of the second pixels.

5. The display device of claim 4, wherein, when the second display area is driven in the charging mode and the illuminance is less than the reference illuminance, a data signal corresponding to a low grayscale less than the high grayscale is provided to each of the second pixels in the charging mode.

6. The display device of claim 5, wherein, when the second display area is driven in the charging mode and the illuminance is less than the reference illuminance, a driving time of the second display area is determined based on charging information generated by learning a charging time of the battery.

7. The display device of claim 1, wherein, when the second display area is driven in the charging mode, the processor drives the second display area in a way such that a degradation degree of a second pixel disposed in a boundary area of the second display area which is adjacent to the first display area is equal to a degradation degree of a first pixel symmetrically positioned to the second pixel with respect to the boundary line.

8. The display device of claim 1, wherein, when the second display area is driven in the charging mode, the processor drives the second display area in a way such that degradation degrees of second pixels disposed in a boundary area of the second display area which is adjacent to the first display area and arranged in a direction crossing the boundary line gradually increase or decrease as being away from the boundary line.

9. The display device of claim 8, wherein, when the second display area is driven in the charging mode, the degradation degrees of the second pixels disposed in the boundary area gradually increase or decrease from a degradation degree of a first pixel adjacent to the boundary line to the average of degradation degrees of the first pixels included in the first display area as being away from the boundary line.

10. The display device of claim 1, further comprising:

a memory which stores accumulated stress data generated based on image data, wherein degradation degrees of the first pixels and degradation degrees of the second pixels are calculated using the accumulated stress data.

11. The display device of claim 1, wherein the display panel is a flexible display panel rollable into the housing.

12. A method of driving a display device including a housing and a display panel inserted into or withdrawn from the housing, wherein the display panel includes a first display area and a second display area adjacent to the first display area with a boundary line therebetween, the method comprising:

driving the first display area in a display mode in which the display panel displays an image in a state where the first display area is withdrawn from the housing and the second display area is inserted into the housing;

calculating a difference between an average of degradation degrees of first pixels included in the first display area and an average of degradation degrees of second pixels included in the second display area in a charging mode in which a battery of the display device is charged, wherein the battery provides a power to the display panel; and driving the second display area in a way such that the average of the degradation degrees of the second pixels is equal to the average of the degradation degrees of the first pixels in the charging mode, wherein a driving grayscale and a driving time of the second display area in the charging mode is determined based on an illuminance of an ambient light and a charging time of the battery.

13. The method of claim 12, wherein, when the first display area is driven in the display mode, a data signal corresponding to a minimum grayscale is provided to each of the second pixels.

14. The method of claim 12, wherein, when the first display area is driven in the display mode, the second display area is not driven.

15. The method of claim 12, wherein, when the second display area is driven in the charging mode and the illuminance of the ambient light is greater than a reference illuminance, a data signal corresponding to a high grayscale is provided to each of the second pixels.

16. The method of claim 15, wherein, when the second display area is driven in the charging mode and the illuminance is less than the reference illuminance, a data signal corresponding to a low grayscale less than the high grayscale is provided to each of the second pixels.

17. The method of claim 16, wherein, when the second display area is driven in the charging mode and the illuminance is less than the reference illuminance, a driving time of the second display area is determined by charging information generated by learning a charging time of the battery.

18. The method of claim 12, wherein, when the second display area is driven in the charging mode, the second display area is driven in a way such that a degradation degree of a second pixel disposed in a boundary area of the second display area which is adjacent to the first display area is equal to a degradation degree of a first pixel symmetrically positioned to the second pixel with respect to the boundary line.

19. The method of claim 12, wherein, when the second display area is driven in the charging mode, the second display area is driven such that degradation degrees of second pixels disposed in a boundary area of the second display area which is adjacent to the first display area and arranged in a direction crossing the boundary line gradually increase or decrease as being away from the boundary line.

20. The method of claim 19, wherein, when the second display area is driven in the charging mode, the degradation degrees of the second pixels disposed in the boundary area gradually increase or decrease from a degradation degree of a first pixel adjacent to the boundary line to the average of the degradation degrees of the first pixels included in the first display area as being in away from the boundary line.

* * * * *